(12) United States Patent
Sakai

(10) Patent No.: US 8,913,096 B2
(45) Date of Patent: Dec. 16, 2014

(54) OPTICAL SCANNING DEVICE AND IMAGE FORMING APPARATUS

(75) Inventor: Kohji Sakai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 61 days.

(21) Appl. No.: 13/213,272

(22) Filed: Aug. 19, 2011

(65) Prior Publication Data

US 2012/0050444 A1 Mar. 1, 2012

(30) Foreign Application Priority Data

Aug. 25, 2010 (JP) ................................ 2010-188025

(51) Int. Cl.
| | | |
|---|---|---|
| B41J 2/385 | (2006.01) | |
| B41J 2/47 | (2006.01) | |
| B41J 2/435 | (2006.01) | |
| G02B 26/12 | (2006.01) | |
| G02B 27/00 | (2006.01) | |

(52) U.S. Cl.
CPC .............. *B41J 2/473* (2013.01); *G02B 26/125* (2013.01); *G02B 27/0031* (2013.01); *G02B 26/127* (2013.01)
USPC ........... 347/236; 347/235; 347/246; 347/250; 347/130

(58) Field of Classification Search
CPC .............. B41J 2/385; B41J 2/47; B41J 2/435; B41J 2/473; B41J 2/471; B41J 2/442
USPC .......................... 347/130, 235, 236, 246, 250
See application file for complete search history.

(56) References Cited

U.S. PATENT DOCUMENTS

| | | |
|---|---|---|
| 5,831,758 A | 11/1998 | Sakai et al. |
| 5,999,345 A | 12/1999 | Nakajima et al. |
| 6,166,842 A | 12/2000 | Aoki et al. |
| 6,256,133 B1 | 7/2001 | Suzuki et al. |
| 6,347,004 B1 | 2/2002 | Suzuki et al. |
| 6,366,384 B1 | 4/2002 | Aoki et al. |

(Continued)

FOREIGN PATENT DOCUMENTS

| | | |
|---|---|---|
| JP | 2005-266775 A | 9/2005 |
| JP | 2005-274678 | 10/2005 |

(Continued)

OTHER PUBLICATIONS

Office Action issued Nov. 28, 2013, in Japanese Patent Application No. 2010-188025.

*Primary Examiner* — Justin Seo
*Assistant Examiner* — Kendrick Liu
(74) *Attorney, Agent, or Firm* — Oblon, Spivak, McClelland, Maier & Neustadt, L.L.P.

(57) ABSTRACT

An optical scanning device that scans a scanning surface in a main scanning direction. The device includes a surface emitting laser as a light source, an optical deflector that deflects a light flux from the light source while rotating around a rotation axis, a monitor light receiving element, a synchronization detection light receiving element, a monitor optical system that directs the monitor light flux to the monitor light receiving element, a synchronization detection optical system that directs the synchronization detection light flux to the synchronization detection light receiving element, and a scanning optical system that directs a scanning light flux to the scanning surface. A combined focal length of the monitor optical system in the main scanning direction is smaller than a combined focal length of the synchronization detection optical system in the main scanning direction.

11 Claims, 13 Drawing Sheets

(56) References Cited

U.S. PATENT DOCUMENTS

| | | | |
|---|---|---|---|
| 6,388,792 B1 | 5/2002 | Atsuumi et al. | |
| 6,448,998 B1 | 9/2002 | Suzuki et al. | |
| 6,509,995 B1 | 1/2003 | Suzuki et al. | |
| 6,596,985 B2 | 7/2003 | Sakai et al. | |
| 6,771,407 B2 | 8/2004 | Hayashi et al. | |
| 6,781,729 B2 | 8/2004 | Suzuki et al. | |
| 6,856,438 B2 | 2/2005 | Takanashi et al. | |
| 6,999,208 B2 | 2/2006 | Suzuki et al. | |
| 7,006,120 B2 | 2/2006 | Sakai et al. | |
| 7,034,973 B2 | 4/2006 | Sakai | |
| 7,038,822 B2 | 5/2006 | Sakai et al. | |
| 7,215,354 B1 | 5/2007 | Sakai et al. | |
| 7,236,281 B2 | 6/2007 | Hayashi et al. | |
| 7,251,067 B2 | 7/2007 | Kudo | |
| 7,253,937 B2 | 8/2007 | Ueda et al. | |
| 7,330,296 B2 | 2/2008 | Sakai | |
| 7,362,486 B2 | 4/2008 | Hayashi et al. | |
| 7,411,712 B2 | 8/2008 | Nakajima et al. | |
| 7,417,777 B2 | 8/2008 | Saisho et al. | |
| 7,443,558 B2 | 10/2008 | Sakai et al. | |
| 7,466,333 B2 | 12/2008 | Kato | |
| 7,616,364 B2 | 11/2009 | Saisho et al. | |
| 7,663,657 B2 | 2/2010 | Ichii et al. | |
| 7,672,032 B2 | 3/2010 | Hayashi et al. | |
| 7,688,491 B2 | 3/2010 | Saisho et al. | |
| 7,876,486 B2 | 1/2011 | Saisho et al. | |
| 7,973,990 B2 | 7/2011 | Sakai et al. | |
| 8,063,927 B2 | 11/2011 | Kato | |
| 8,373,736 B2 | 2/2013 | Funato et al. | |
| 2007/0081071 A1* | 4/2007 | Kato | 347/253 |
| 2007/0206261 A1 | 9/2007 | Hayashi et al. | |
| 2007/0253047 A1 | 11/2007 | Ichii et al. | |
| 2008/0018973 A1* | 1/2008 | Cho | 359/216 |
| 2009/0059333 A1 | 3/2009 | Sakai | |
| 2009/0195635 A1* | 8/2009 | Ishida et al. | 347/243 |
| 2010/0194843 A1 | 8/2010 | Sakai et al. | |
| 2011/0063594 A1 | 3/2011 | Sakai | |
| 2011/0090549 A1 | 4/2011 | Sakai | |
| 2011/0228368 A1 | 9/2011 | Sakai et al. | |

FOREIGN PATENT DOCUMENTS

| | | |
|---|---|---|
| JP | 2007-108298 A | 4/2007 |
| JP | 2007-298563 | 11/2007 |
| JP | 4340515 | 7/2009 |
| JP | 2010-61114 A | 3/2010 |

* cited by examiner

FIG.5

| | DEFLECTOR SIDE SCANNING LENS | |
|---|---|---|
| | INCIDENT SURFACE | EMITTING SURFACE |
| $R_m$ | -125.930 | -60.678 |
| K | 0 | 0 |
| $a_{04}$ | $6.91397 \times 10^{-7}$ | $7.94205 \times 10^{-7}$ |
| $a_{06}$ | $-1.17421 \times 10^{-10}$ | $8.10435 \times 10^{-11}$ |
| $a_{08}$ | $-7.59529 \times 10^{-14}$ | $-4.46442 \times 10^{-14}$ |
| $a_{10}$ | $4.98921 \times 10^{-17}$ | $6.78493 \times 10^{-18}$ |
| $a_{12}$ | $-7.99430 \times 10^{-21}$ | $4.18587 \times 10^{-21}$ |
| $R_s$ | -500 | -550 |
| $b_{01}$ | - | $9.48903 \times 10^{-6}$ |
| $b_{02}$ | - | $-4.04246 \times 10^{-6}$ |
| $b_{03}$ | - | $7.83108 \times 10^{-9}$ |
| $b_{04}$ | - | $-2.32948 \times 10^{-9}$ |
| $b_{05}$ | - | $-1.27532 \times 10^{-11}$ |
| $b_{06}$ | - | $1.22637 \times 10^{-12}$ |
| $b_{07}$ | - | $2.55440 \times 10^{-15}$ |
| $b_{08}$ | - | $4.46134 \times 10^{-16}$ |
| $b_{09}$ | - | $6.68092 \times 10^{-19}$ |
| $b_{10}$ | - | $-1.67752 \times 10^{-19}$ |

FIG.6

| | IMAGE SIDE SCANNING LENS | |
|---|---|---|
| | INCIDENT SURFACE | EMITTING SURFACE |
| $R_m$ | -10000 | 520.144 |
| K | 0 | 0 |
| $a_{04}$ | $3.29667 \times 10^{-7}$ | $1.27206 \times 10^{-7}$ |
| $a_{06}$ | $-7.12268 \times 10^{-11}$ | $-4.62723 \times 10^{-11}$ |
| $a_{08}$ | $6.28263 \times 10^{-15}$ | $4.04792 \times 10^{-15}$ |
| $a_{10}$ | $-2.72118 \times 10^{-19}$ | $-1.65776 \times 10^{-19}$ |
| $a_{12}$ | $4.69377 \times 10^{-24}$ | $2.58917 \times 10^{-24}$ |
| $R_s$ | 268.018 | -44.257 |
| $b_{01}$ | $1.92169 \times 10^{-6}$ | - |
| $b_{02}$ | $-9.73515 \times 10^{-7}$ | $3.26958 \times 10^{-7}$ |
| $b_{03}$ | $2.78624 \times 10^{-10}$ | - |
| $b_{04}$ | $7.99963 \times 10^{-11}$ | - |
| $b_{05}$ | $-8.27927 \times 10^{-14}$ | - |
| $b_{06}$ | $1.16623 \times 10^{-14}$ | - |
| $b_{07}$ | $8.54769 \times 10^{-18}$ | - |
| $b_{08}$ | $-1.73644 \times 10^{-18}$ | - |
| $b_{09}$ | $-3.04034 \times 10^{-22}$ | - |
| $b_{10}$ | $6.41013 \times 10^{-23}$ | - |

FIG.11A FIG.11B
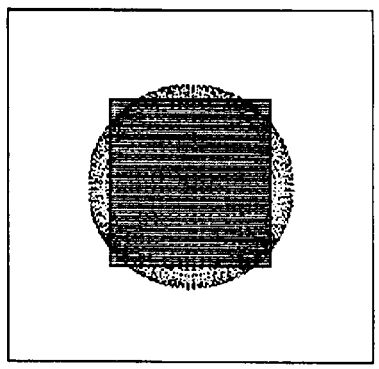
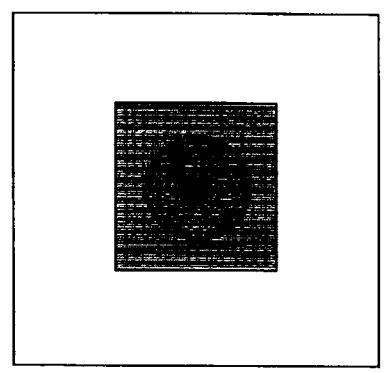
FIG.12
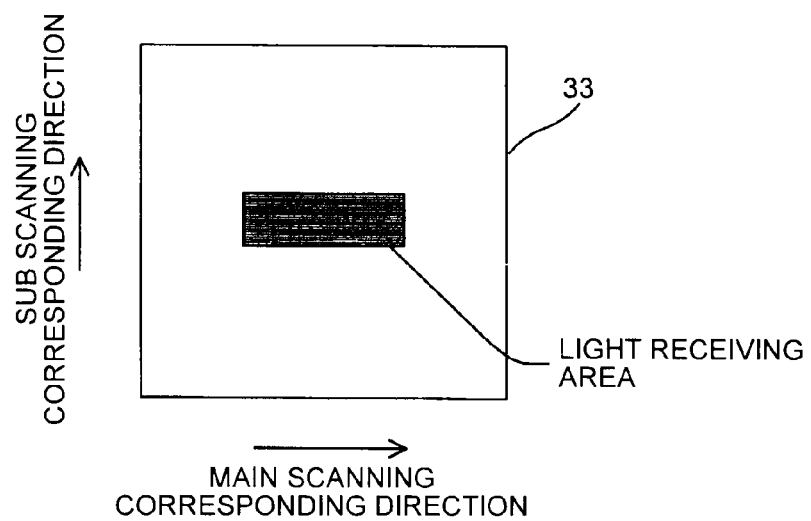
FIG.13
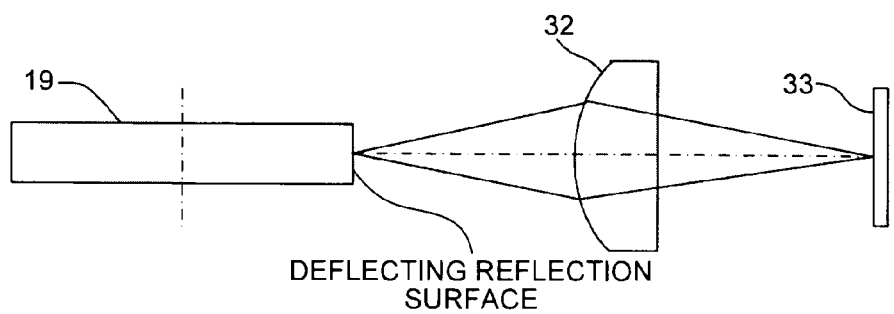

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-188025 filed in Japan on Aug. 25, 2010.

BACKGROUND OF THE INVENTION

1. Field of the Invention

The present invention relates to an optical scanning device and an image forming apparatus and, more particularly, to an optical scanning device that scans a scanning surface with light and an image forming apparatus that includes the optical scanning device.

2. Description of the Related Art

Image forming apparatuses that utilize a laser as a light source are often used for forming electrophotographic images. For that purpose, the image forming apparatus is equipped with an optical scanning device that scans the surface of a photosensitive element with a light flux (a scanning light flux) that has been emitted from the light source and deflected by an optical deflector in order to form a latent image on the photosensitive element.

As the light source, a semiconductor laser is used in general. An edge emitting laser has been most used, however in recent years, a vertical cavity surface emitting laser (also known as VCSEL) has been introduced. In the edge emitting laser, approximately only four up to eight is the limit of the number of emitting elements in its array configuration. Meanwhile, the surface emitting laser makes it possible to further increase the number of emitting elements in its array configuration. For that reason, the surface emitting laser is now expected to be the light source that realizes higher density and faster speed in the image forming apparatuses.

However, in the image forming apparatuses, the light intensity of the scanning light flux may vary with a variation in temperature and/or time. Thus, a density irregularity may be induced in an image finally outputted (an output image).

Hence, an optical scanning device with the conventional edge emitting laser performs auto power control (APC) that monitors the light emitted backward from the edge emitting laser to control the variation in the light output. However, the surface emitting laser has a structure not allowing the light emitted backward therefrom. Therefore, it is required a way of controlling the light output (the light intensity) different from the conventional APC in the optical scanning device that uses the surface emitting laser. As such a way of controlling the light output suitable for the apparatus or device that uses the surface emitting laser, there is proposed some methods that a part of the light flux emitted from the surface emitting laser is split by an optical element, such as a beam splitter or half mirror, and directed to an optical detector, so that the APC is performed according to the output from the optical detector. These methods are disclosed by Japanese Patent Application Laid-open No. 2005-274678 and in Japanese Patent Application Laid-open No. 2007-298563.

In the optical scanning device disclosed by Japanese Patent Application Laid-open No. 2005-274678, however, the light output of a laser beam directed to the scanning surface necessarily decreases by an amount of the laser beam directed to the optical sensor. Therefore, the disclosed method has a disadvantage in realizing the high speed image forming.

Also in the optical scanning device disclosed by Japanese Patent Application Laid-open No. 2007-298563, the proposed method has a disadvantage in a point that the accuracy of the APC decreases, when the splitting device has any machining error.

SUMMARY OF THE INVENTION

It is an object of the present invention to at least partially solve the problems in the conventional technology.

According to an aspect of the present invention, there is provided an optical scanning device that scans a scanning surface in a main scanning direction, the optical scanning device includes: a light source that includes a surface emitting laser; an optical deflector that includes a reflection surface that reflects a light flux from the light source while rotating around a rotation axis; a monitor light receiving element that receives a monitor light flux; a synchronization detection light receiving element that receives a synchronization detection light flux; a monitor optical system that directs the monitor light flux to the monitor light receiving element, the monitor light flux reflected on the reflection surface; a synchronization detection optical system that directs the synchronization detection light flux to the synchronization detection light receiving element, the synchronization detection light flux reflected on the reflection surface; and a scanning optical system that directs a scanning light flux to the scanning surface, the scanning light flux reflected on the reflection surface. A combined focal length of the monitor optical system in the main scanning direction is smaller than a combined focal length of the synchronization detection optical system in the main scanning direction.

According to the optical scanning device as one aspect of the invention, a stable optical scanning can be performed.

According to an aspect of the present invention, there is provided an image forming apparatus includes: at least one image carrier; and an optical scanning device that scans said at least one image carrier with a light flux which is modulated corresponding to image data. The optical scanning device includes: a light source that includes a surface emitting laser; an optical deflector that includes a reflection surface that reflects a light flux from the light source while rotating around a rotation axis; a monitor light receiving element that receives a monitor light flux; a synchronization detection light receiving element that receives a synchronization detection light flux; a monitor optical system that directs the monitor light flux to the monitor light receiving element, the monitor light flux reflected on the reflection surface; a synchronization detection optical system that directs the synchronization detection light flux to the synchronization detection light receiving element, the synchronization detection light flux reflected on the reflection surface; and a scanning optical system that directs a scanning light flux to the scanning surface, the scanning light flux reflected on the reflection surface. A combined focal length of the monitor optical system in the main scanning direction is shorter than a combined focal length of the synchronization detection optical system in the main scanning direction.

According to the image forming apparatus as one aspect of the invention, high-quality images can be formed, since the apparatus is provided with the optical scanning device as one aspect of the invention.

The above and other objects, features, advantages and technical and industrial significance of this invention will be better understood by reading the following detailed descrip-

BRIEF DESCRIPTION OF THE DRAWINGS

FIG. 5 is a table showing numerical values relating to optical surface shapes of a deflector side scanning lens;

FIG. 6 is a table showing numerical values relating to optical surface shapes of an image side scanning lens;

FIG. 11A is a schematic diagram illustrating a light spot at the position Q in FIG. 10;

FIG. 11B is a schematic diagram illustrating a light spot at the position R in FIG. 10;

FIG. 12 is a schematic diagram illustrating a light receiving area of a light receiving element according to the modified embodiment;

FIG. 13 is a schematic diagram illustrating a condenser lens of the monitor optical system according to the modified embodiment;

DETAILED DESCRIPTION OF THE PREFERRED EMBODIMENTS

Figure 1:
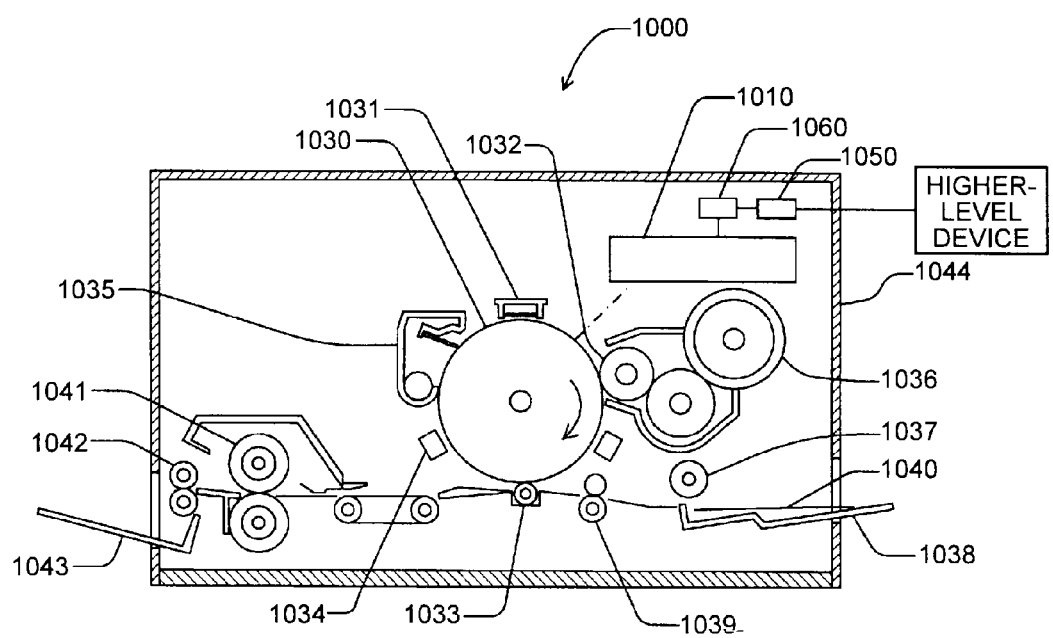
FIG. 1 is a schematic diagram illustrating a configuration of a laser printer according to one embodiment of the present invention.

An embodiment of the present invention is described below with reference to FIGS. 1 to 9. FIG. 1 shows a configuration of a laser printer 1000 according to one embodiment.

The laser printer 1000 includes an optical scanning device 1010, a photosensitive element 1030, an electrical charger 1031, a developing roller 1032, a transfer charger 1033, a neutralizing unit 1034, a cleaning unit 1035, a toner cartridge 1036, a paper feeding roller 1037, a paper cassette 1038, a pair of registration rollers 1039, a fixing roller 1041, a discharge roller 1042, a discharge tray 1043, a communication control device 1050, and a printer control device 1060 that integrally controls each of the above components and/or devices. The above components and/or devices are disposed in their predetermined positions inside a printer housing 1044.

The communication control device 1050 controls an interactive communication with a higher-level device (for example, a personal computer) via a network for example.

The photosensitive element 1030 is a cylinder shaped component and has a surface on which the photosensitive layer is formed. In other words, the surface of the photosensitive element 1030 is a surface to be scanned (a scanning surface). The photosensitive element 1030 rotates in a direction indicated by an arrow illustrated in FIG. 1.

The electrical charger 1031, the developing roller 1032, the transfer charger 1033, the neutralizing unit 1034 and the cleaning unit 1035 are all placed in the vicinity of the surface of the photosensitive element 1030. The electrical charger 1031, the developing roller 1032, the transfer charger 1033, the neutralizing unit 1034, and the cleaning unit 1035 are disposed in this order along the rotating direction of the photosensitive element 1030.

The electrical charger 1031 evenly charges the surface of the photosensitive element 1030.

The optical scanning device 1010 scans the surface of the photosensitive drum 1030, which is electrically charged by the electrical charger 1030, with the light flux modified corresponding to image information from the higher-level device. Thus, a latent image corresponding to the image information is formed on the surface of the photosensitive element 1030. The formed latent image is conveyed toward the developing roller 1032 in accordance with the rotation of the photosensitive element 1030. The configuration of the optical scanning device 1010 will be described later.

The toner cartridge 1036 accommodates toner that is supplied to the developing roller 1032.

The developing roller 1032 makes the toner supplied from the toner cartridge 1036 attach with the image formed on the surface of the photosensitive drum 1030 so as to make the image information visible. The latent image attached with the toner (hereinafter also referred to as "toner image" for convenience) is conveyed toward the transfer charger 1033 in accordance with the rotation of the photosensitive element 1030.

The paper cassette 1038 accommodates recording sheets 1040. In the vicinity of the paper cassette 1038, the paper feeding roller 1037 is disposed. The paper feeding roller 1037 picks up a recording sheet 1040 one by one from the paper cassette 1038 and conveys the recording sheet 1040 to the pair of registration rollers 1039. The pair of registration rollers 1039 temporarily holds the recording sheet 1040 that had just been picked up by the paper feeding roller 1037, and conveys the recording sheet 1040 toward the gap between the photosensitive element 1030 and the transfer charger 1033 in accordance with the rotation of the photosensitive element 1030.

The transfer charger 1033 is applied with the voltage of a reverse polarity to the toner so as to electrically attract the toner from the surface of the photosensitive element 1030 to the recording sheet 1040. This voltage causes the toner image on the surface of the photosensitive element 1030 to be transferred onto the recording sheet 1040. The recording sheet 1040 onto which the toner image is transferred is then conveyed to the fixing roller 1041.

Heat and pressure is applied to the recording sheet 1040 at the fixing roller 1041 and thus the toner is fixed onto the recording sheet 1040. The recording sheet 1040 on which the toner is fixed is conveyed to the discharge tray 1043 via the discharge rollers 1042 and then stacked on the discharge tray 1043 sequentially.

The neutralizing unit 1034 neutralizes the surface of the photosensitive element 1030.

The cleaning unit 1035 removes the toner that remains on the surface of the photosensitive element 1030 (the residual toner). The surface of the photosensitive element 1030 from which the residual toner has been removed returns to a position to face the electrical charger 1031.

The configuration of the optical scanning device 1010 will be described below.

Figure 2:
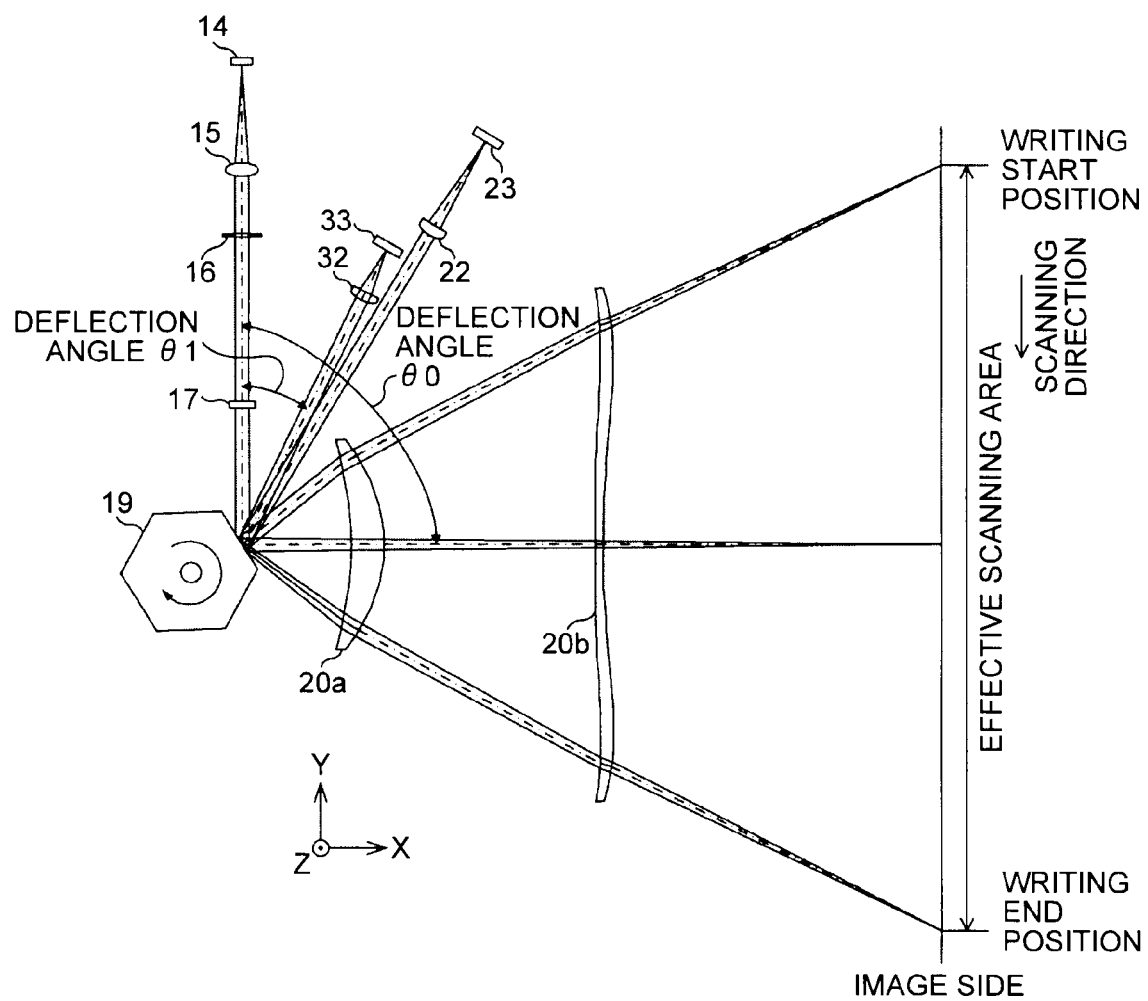
FIG. 2 is a first schematic diagram illustrating a configuration of an optical scanning device in FIG. 1.
Figure 3:
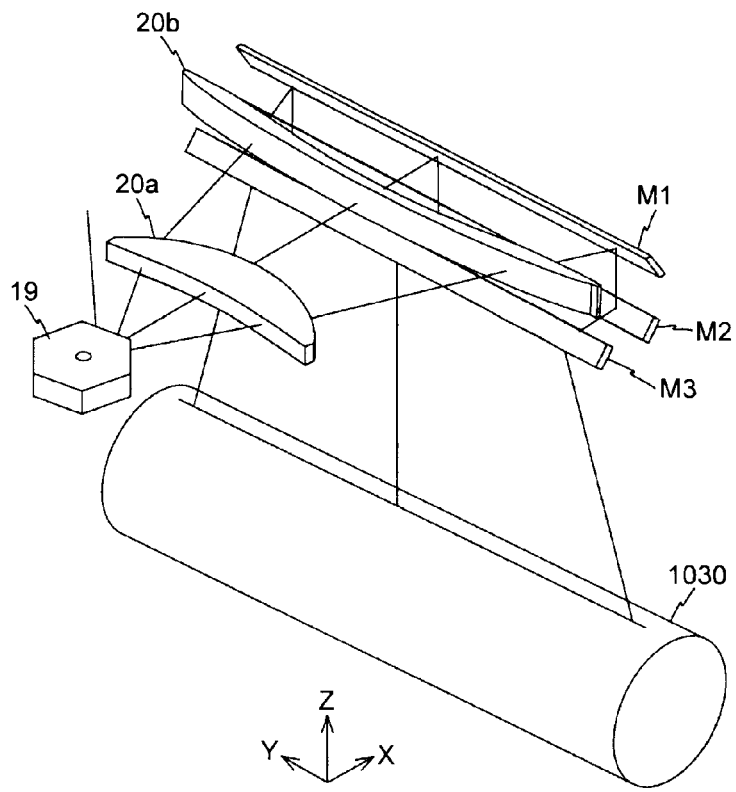
FIG. 3 is a second schematic diagram illustrating a configuration of the optical scanning device in FIG. 1.

As illustrated in FIGS. 2 and 3, the optical scanning device 1010 includes a light source 14, a coupling lens 15, an aperture plate 16, a cylindrical lens 17, a polygon mirror 19, a deflector side scanning lens 20a, an image side scanning lens 20b, three reflection mirrors (M1, M2, and M3), a condenser lens 22, a synchronization detection sensor 23, a condenser lens 32, a light receiving element 33, and a scanning control device (not illustrated). The above components and/or devices are assembled to their predetermined positions in an optical system housing (not illustrated).

In the present specification, it is assumed that, in an XYZ three dimensional orthogonal coordinate system, the Y-axis direction is along the longitudinal direction of the photosensitive element 1030 and the X-axis direction is along the optical axis direction of the scanning lenses (20a, 20b). Moreover, for the sake of convenience, hereinafter a direction that corresponds to the main scanning direction is referred to as a "main scanning corresponding direction" and a direction that corresponds to the sub scanning direction is referred to as a "sub scanning corresponding direction".

Figure 4:
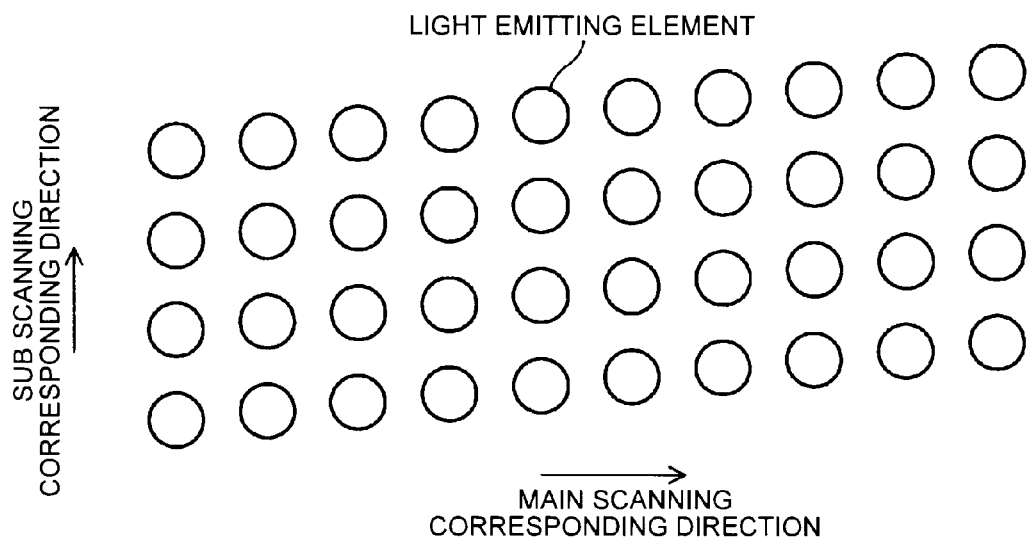
FIG. 4 is a schematic diagram illustrating a two dimensional array included in a light source.

As illustrated in FIG. 4 for example, the light source 14 includes a two dimensional array of forty light emitting elements which are arranged on one substrate in a two dimensional manner. These forty light emitting elements are disposed in a manner that a distance between two adjacent light emitting elements is the same as for all elements in an orthogonal projection of all light emitting elements on a virtual line extending in the sub scanning direction. Herein, the "distance between two adjacent light emitting elements" means a distance between a center point of one light emitting element and a center point of the adjacent light emitting element.

Each light emitting element is a type of VCSEL (Vertical Cavity Surface Emitting Laser) having its design wavelength band 780 nm. That is, the two dimensional array is so-called an array of surface emitting laser.

The light source 14 includes a drive circuit (not shown) for driving individually each element of the two dimensional array. The drive circuit and the two dimensional array are implemented on a circuit substrate (not shown). The polarization status of the light flux emitted from the light source 14 is set to be a p-polarized light relative to the polygon mirror 19.

Referring back to FIG. 2, the coupling lens 15 is disposed on the optical path of the light flux emitted from the light source 14, so that the light flux becomes a substantially parallel light flux.

The aperture plate 16 has an aperture and defines a diameter of the light flux passed through the coupling lens 15.

The cylindrical lens 17 is disposed on the optical path of the light flux passed through the aperture of the aperture plate 16, so that the light flux forms an image in the vicinity of a deflecting reflection surface of the polygon mirror 19 in the sub scanning corresponding direction (the Z-axis direction in this example). The cylindrical lens 17 constitutes a face tangle error correction system in the sub scanning corresponding direction cooperatively with each of the scanning lenses.

An optical system arranged on the optical path between the light source 14 and the polygon mirror 19 is also referred to as a pre-deflector optical system. In this embodiment, the pre-deflector optical system is composed of the coupling lens 15, the aperture plate 16, and the cylindrical lens 17.

The polygon mirror 19 may be a six-sided mirror for one example. Each mirror acts as a deflecting reflection surface. This polygon mirror 19 rotates around an axis parallel to the sub scanning corresponding direction (the Z axis direction in this example) at a constant speed. Thus, the light flux from the cylindrical lens 17 is deflected.

The deflector side scanning lens 20a is made of resin and disposed on an optical path of a scanning light flux (a writing light flux) deflected at the polygon mirror 19.

The image side scanning lens 20b is made of resin and disposed on an optical path of the light flux passed through the deflector side scanning lens 20a.

The light flux passed through the image side scanning lens 20b is irradiated to a surface of the photosensitive element 1030 via the reflection mirrors M1, M2, and M3, so that a light spot is formed on the surface of the photosensitive element. This light spot moves in a longitudinal direction of the photosensitive element 1030 in accordance with the rotation of the polygon mirror 19. That is, the surface of the photosensitive element 1030 is scanned. In this case, a direction along which the light spot moves corresponds to the "main scanning direction". And, a direction along which the photosensitive drum 1030 rotates corresponds to the "sub scanning direction".

Each surface (i.e. incident surface and emitting surface of respective lens) of the scanning lenses 20a and 20b is an aspheric surface represented by the equations (1) and (2). In these equations, the symbol X represents a coordinate in the X-axis direction and the symbol Y represents a coordinate in the Y-axis direction. And, Y is zero (Y=0) at the center of the incident surface. The symbol $R_m$ is the radius of curvature at Y=0 in the main scanning corresponding direction. The symbol K represents a conic constant. The symbols $a_{04}$, $a_{06}$, $a_{08}$, . . . represent the aspheric coefficients in the main scanning corresponding direction. The symbol Cs(Y) represents the curvature in the sub scanning corresponding direction with respect to Y. The symbol $R_s$ represents the radius of curvature on the optical axis in the sub scanning corresponding direction. The symbols $b_{01}$, $b_{02}$, . . . represent the aspheric coefficients in the sub scanning corresponding direction. The optical axis means an axis that passes the center point in the sub scanning corresponding direction, when Y=0.

$$X(Y) = \frac{Y^2/R_m}{1+\sqrt{1-(1+K)\cdot(Y/R_m)^2}} + \quad (1)$$
$$a_{04}\cdot Y^4 + a_{06}\cdot Y^6 + a_{08}\cdot Y^8 + a_{10}\cdot Y^{10} + a_{12}\cdot Y^{12} + \ldots$$

$$Cs(Y) = \frac{1}{R_S} + b_{01}\cdot Y + b_{02}\cdot Y^2 + b_{03}\cdot Y^3 + b_{04}\cdot Y^4 + b_{05}\cdot Y^5 + \ldots \quad (2)$$

FIG. 5 shows exemplary numerical values corresponding to $R_m$, $R_s$ and aspheric coefficients of both surfaces (incident surface and emitting surface) of the deflector side scanning lens 20a.

FIG. 6 shows exemplary numerical values corresponding to $R_m$, $R_s$ and aspheric coefficients of both surfaces (incident surface and emitting surface) of the image side scanning lens 20b.

The point of origin (optical axis position) on the incident surface of the deflector side scanning lens 20a is positioned at, from the rotation axis of the polygon mirror 19, 68.63 mm away in the X-axis direction and 12.43 mm away in the Y-axis direction.

The deflector side scanning lens 20a has 14 mm in thickness on the optical axis. A spacing between the deflector side scanning lens 20a and the image side scanning lens 20b is 89.34 mm. The image side scanning lens 20b has 3.5 mm in thickness on the optical axis. A distance between the image side scanning lens 20b and the scanning surface is 143.92 mm.

The condenser lens 32 condenses a monitor light flux which is deflected at the polygon mirror 19.

The light receiving element 33 receives the monitor light flux passed through the condenser lens 32. The light receiving element 33 outputs an electrical signal corresponding to the intensity of the received light. Incidentally, the configuration composed of the condenser lens 32 and the light receiving element 33 is also referred to as a "light intensity monitoring system". Meanwhile, an optical system arranged between the polygon mirror 19 and the light receiving element 33 is also referred to as a "monitor optical system". In this embodiment, the monitor optical system is composed of the condenser lens 32.

The scanning control device performs the APC (Auto Power Control) on the basis of the output signal from the light receiving element 33 at every predetermined timing.

The condenser lens 22 condenses a synchronization detection light flux which is deflected at the polygon mirror 19.

The synchronization detection sensor 23 receives the synchronization detection light flux passed through the condenser lens 22. The synchronization detection sensor 23 outputs an electrical signal corresponding to the intensity of the received light. The configuration composed of the condenser lens 22 and the synchronization detection sensor 23 is also referred to as a "synchronization detection system". An optical system arranged between the polygon mirror 19 and the synchronization detection sensor 23 is also referred to as a "synchronization detection optical system". In this embodiment, the synchronization detection optical system is composed of the condenser lens 22.

The scanning control device computes a timing to start writing on the basis of the output signal from the synchronization detection sensor 23.

Incidentally, a shape of the light receiving area of the synchronization detection sensor 23 is a rectangular having its side in the sub scanning corresponding direction longer than its side in the main scanning corresponding direction. In this case, it is possible to improve the detection accuracy (i.e. resolution) of a timing when the synchronization detection light flux passes the light receiving area.

Figure 7:
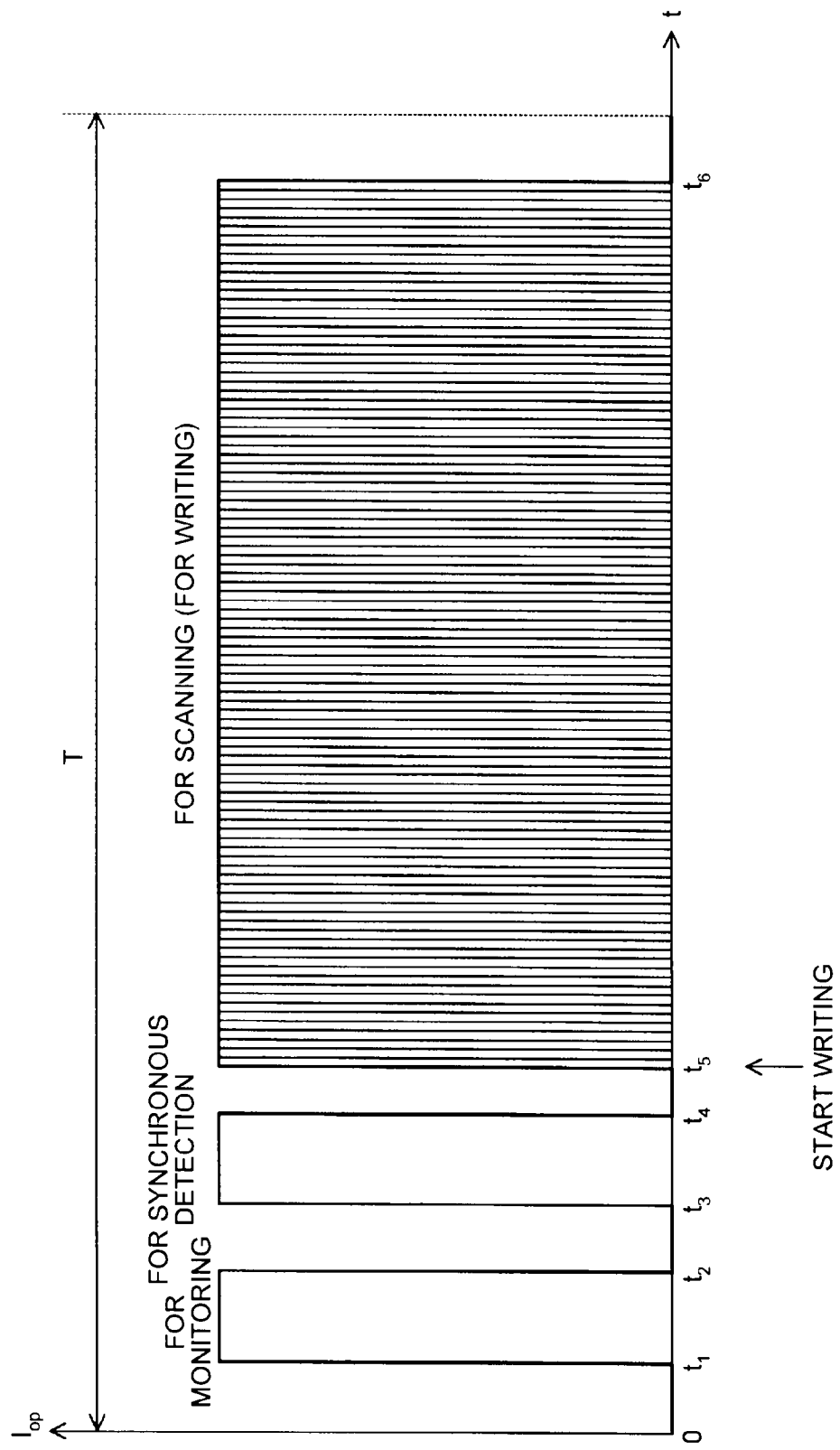
FIG. 7 is a time chart illustrating a drive signal of the light source.

FIG. 7 shows a time chart of the drive current $T_{op}$ supplied to the light emitting elements of the light source 14. The time T in FIG. 7 is a value obtained by dividing the time required for one revolution of the polygon mirror 19 by the number of deflecting reflection surfaces. That is, T means the time period during which the light flux emitted from the light source 14 is reflected at one deflecting reflection surface (i.e. an effective reflection time). In FIG. 7, various timings $t_1$, $t_2$, $t_3$, $t_4$, $t_5$, and $t_6$ satisfy the following relationship, that is, $t_1 < t_2 < t_3 < t_4 < t_5 < t_6$. At a timing t represented by the inequation $t_1 \leq t \leq t_2$, the light flux toward the light receiving element 33 is emitted. This light flux corresponds to the monitor light flux. At a timing t represented by the inequation $t_3 \leq t \leq t_4$, the light flux toward the synchronization detection sensor 23 is emitted. This light flux corresponds to the synchronization detection light flux. At a timing t represented by the inequation $t_5 \leq t \leq t_6$, the light flux toward the deflector side scanning lens 20a is emitted. This light flux corresponds to the scanning light flux (the writing light flux). Incidentally, $t_5$ indicates the timing to start writing. More specifically, $t_5$ is a timing obtained by adding a predetermined time period to a timing when the synchronization detection sensor 23 detects the synchronization detection light flux. Meanwhile, the scanning light flux (the writing light flux) is a light flux modulated on the basis of the image information.

In other words, the light flux emitted from the light source 14 and entered the polygon mirror 19 via the pre-deflector optical system is deflected to a direction toward the light receiving element 33 in accordance with the rotation of the polygon mirror 19. Then, the light flux is deflected to a direction toward the synchronization detection sensor 23, and further deflected to a direction toward the deflector side scanning lens 20a.

In this case, in view of the APC (Auto Power Control) accuracy, it is preferable that the light receiving element 33 receives the light flux emitted at the timing t represented by the inequation $t_1 \leq t \leq t_2$ as long as possible. On the other hand, in view of the synchronization detection accuracy, it is preferable that the light flux emitted at the timing represented by the inequation $t_3 \leq t \leq t_4$ passes (sweeps) the synchronization detection sensor 23 as quickly as possible. As such, the functions of the light receiving element 33 and the synchronization detection sensor 23 are different from each other. And, these functions can not be combined. Therefore, it is required to set the timing represented by the inequation $t_3 \leq t \leq t_4$ without overlapping the timing represented by the inequation $t_1 \leq t \leq t_2$.

A focal length $f_{mon}$ of the condenser lens 32 and a focal length $f_{syn}$ of the condenser lens 22 are configured so as to satisfy the equation (3).

$$f_{mon} < f_{syn} \tag{3}$$

Moreover, the combined focal length $f_{scn}$ of the deflector side scanning lens 20a and the image side scanning lens 20b is configured so as to satisfy the equation (4).

$$f_{mon} < \{f_{scn}, f_{syn}\}_{min} \tag{4}$$

Incidentally, the notation $\{f_{scn}, f_{syn}\}_{min}$ means to select the smaller one between $f_{scn}$ and $f_{syn}$.

Figure 8:
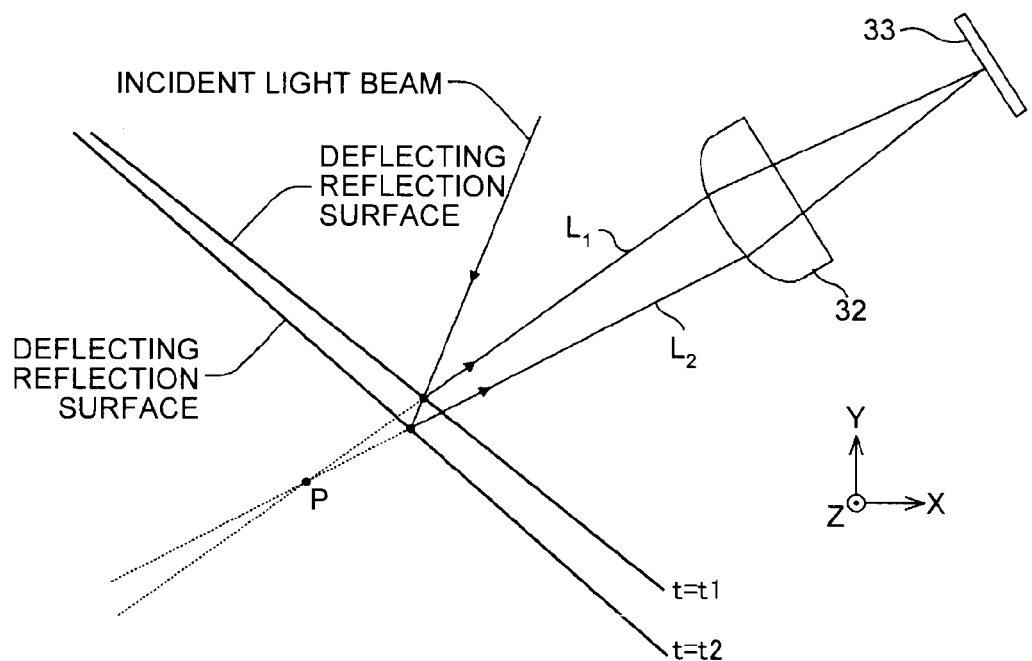
FIG. 8 is a schematic diagram illustrating an alignment of a light receiving element of a monitor optical system.

FIG. 8 illustrates the optical path of the light flux emitted at the timing represented by the inequation $t_1 \leq t \leq t_2$ and reflected on a deflecting reflection surface of the polygon mirror 19. In FIG. 8, $L_1$ represents a line obtained by projecting on a XY plane the light flux reflected on the deflecting reflection surface at the timing $t=t_1$. Furthermore, $L_2$ represents a line obtained by projecting on a XY plane the light flux reflected on the deflecting reflection surface at the timing $t=t_2$. The line $L_1$ is not parallel to the line $L_2$, since the deflecting reflection surface takes different angles between $t_1$ and $t_2$. Therefore, if both lines are extended, these extended lines always intersect with each other. This intersection point is defined as P. If the condenser lens 32 is disposed in a manner that a conjugate relationship is established substantially between the intersection point P and the light receiving element 33, the light flux emitted at the timing t represented by the inequation $t_1 \leq t \leq t_2$ has a stationary point logically on the light receiving element 33. In that case, it is possible to detect the light intensity with an extremely improved accuracy.

Obviously, in order to detect the amount of the light flux (the light intensity) at the light receiving element 33 with a high accuracy, it is required that an enough amount of the light flux enters the light receiving area of the light receiving element 33.

Here, an amount of the light flux at the light receiving element 33 is defined as "$E_{mon}$", and the minimum value of an amount of the light flux on the scanning surface at a timing t represented by the inequation $t_5 \leq t \leq t_6$ is defined as "$E_{img}$". These "$E_{mon}$" and "$E_{img}$" satisfy the equation (5).

$$E_{mon} > E_{img} \qquad (5)$$

Figure 9:
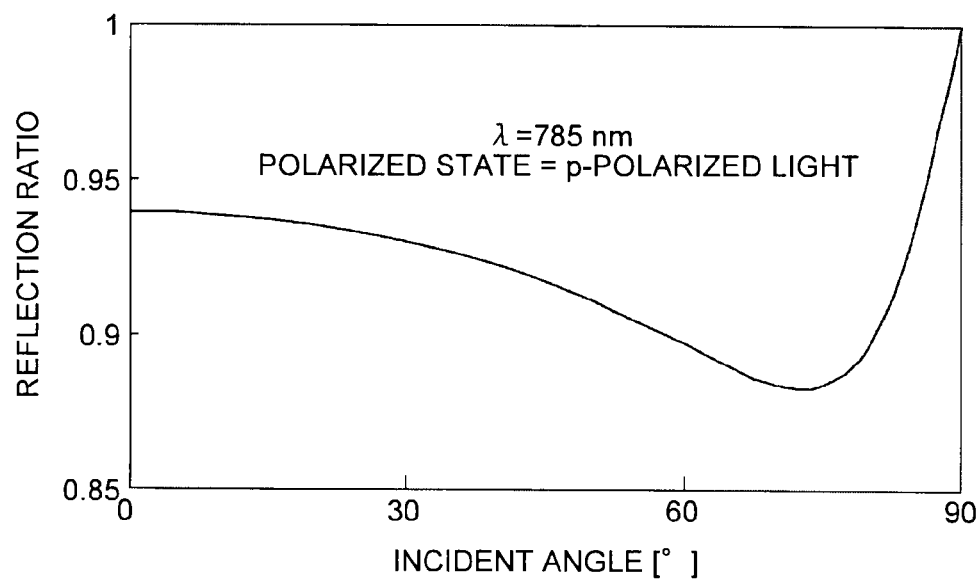
FIG. 9 is a graph illustrating a relationship between a reflection ratio and an incident angle at a reflection surface of an optical deflector when an incident light flux is p-polarized light.

FIG. 9 illustrates the relationship between the reflection ratio (also referred to as the reflectance) and the incident angle of the light which enters the polygon mirror 19 as p-polarized light. According to FIG. 9, there is a tendency that the reflection ratio decreases as the incident angle increases, in a case that the light enters as p-polarized light.

Here, this embodiment is configured in a manner that the incident angle of the monitor light flux relative to the deflecting reflection surface is smaller than the incident angle of the scanning light flux relative to the deflecting reflection surface. That is, the equation θ0>θ1 is satisfied in which θ0 represents a deflection angle on the polygon mirror 19 at a timing that scans the center position (the position where the image height is zero) of the effective scanning area and θ1 represents a deflection angle on the polygon mirror 19 at a timing that the light enters the light receiving element 33. In this configuration, it is possible to optically satisfy the equation (5) above described without changing the intensity of the drive current $I_{op}$ that is supplied to the light emitting elements of the light source 14. Incidentally, the "deflection angle" herein means an angle formed by the incident light and the emitting light (the reflection light) on the deflecting reflection surface.

As described above, the optical scanning device 1010 according to the present embodiment is provided with: the light source 14 that includes the array of surface emitting laser; and the polygon mirror 19 having the deflecting reflection surface that reflects the light flux from the light source 14 while rotating around the rotation axis. The device 1010 is further provided with: the condenser lens 32 that is disposed on the optical path of the light flux that is reflected on the deflecting reflection surface during the time period from $t_1$ to $t_2$; the light receiving element 33 that receives the light flux passed through the condenser lens 32; the condenser lens 22 that is disposed on the optical path of the light flux that is reflected on the deflecting reflection surface during the time period from $t_3$ to $t_4$; the synchronization detection sensor 23 that receives the light flux passed through the condenser lens 22; and the scanning optical system that is disposed on the optical path of the light flux that is reflected on the reflection surface during the time period from $t_5$ to $t_6$, and that directs the light flux to the photosensitive drum 1030. In the above case, T represents a time period during which the light flux from the light source 14 is reflected on one deflecting reflection surface. And, the six different timings $t_1$, $t_2$, $t_3$, $t_4$, $t_5$, and $t_6$ are in a relation in which $0 < t_1 < t_2 < t_3 < t_4 < t_5 < t_6 < T$.

Furthermore, the focal length of the condenser lens 32 in the main scanning corresponding direction is shorter than the focal length of the condenser lens 22 in the main scanning direction.

In this case, it is possible to perform a stable optical scan, since the scan control device enables to perform the APC (Auto Power Control) with high accuracy.

Furthermore, it is possible to perform a plurality of scans simultaneously, since the light source 14 has the two dimensional array.

The laser printer 1000 according to the present embodiment is provided with the optical scanning device 1010. Thereby, it is possible to form a high quality image.

Furthermore, it is possible to form an image at a high speed, since the optical scanning device 1010 is provided with the light source 14 composed of the two dimensional array. Furthermore, it is possible to form a high density image.

Incidentally, in the light intensity monitoring system mentioned above, if a parallel light flux enters the condenser lens 32, the light-condensing point is focused forward of the light receiving element 33 in the above-mentioned embodiment. Thereby, a light spot on the light receiving element 33 may be blurry under some circumstances. It would not make much difference whether the function of the coupling lens 15 is to convert a light flux with high diffusibility into a light flux with low diffusibility or into a light flux with low convergence. If the light receiving area of the light receiving element 33 is too small, a light spot may go beyond the light receiving area of the light receiving element 33, leading not only to insufficient light intensity but also to inaccurate information on the light intensity when the direction of the light flux changes due to changes in environmental temperature and the like.

Figure 10:
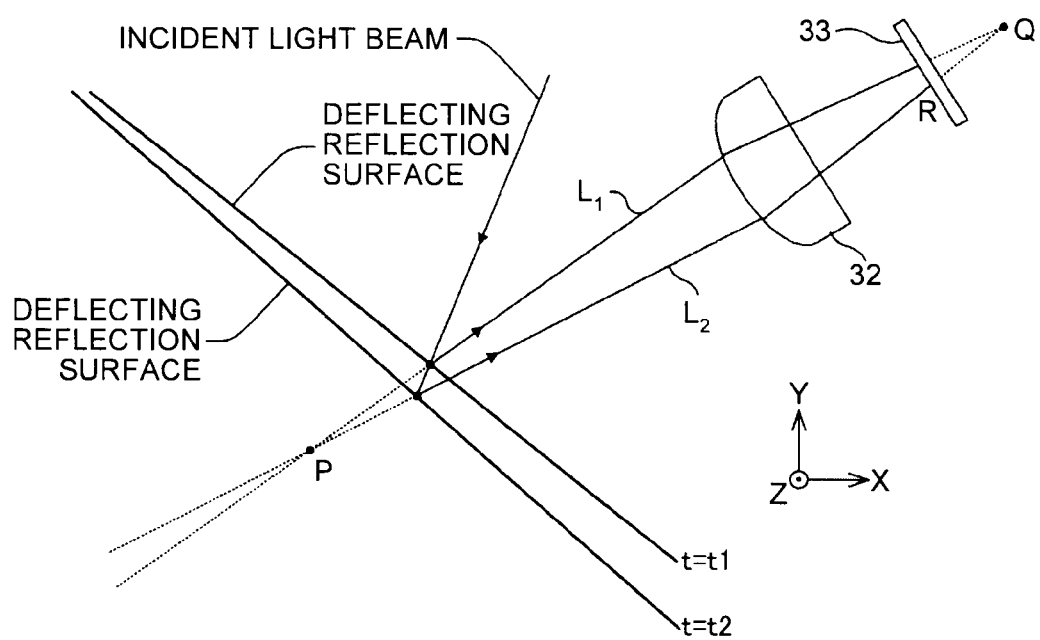
FIG. 10 is a schematic diagram illustrating a modified embodiment of the monitor optical system.

If there is a likelihood of that happening, it is preferable, as illustrated in FIG. 10 for example, to shift the light receiving element 33 toward the polygon mirror 19 relative to the conjugate point Q of the intersection point P through the condenser lens 32. FIG. 11A illustrates an example of the light spot in a case that the light receiving element 33 is disposed at a position of the conjugate point Q. FIG. 11B illustrates an example of the light spot in a case that the light receiving element 33 is disposed at a position of R in FIG. 10.

Furthermore in this case, as illustrated in FIG. 12 for example, the shape of the light receiving area of the light receiving element 33 may be of rectangular with the long side thereof extending in the main scanning corresponding direction, thereby extending a stationary time of the light flux emitted at the timing represented by the inequation $t_1 \le t \le t_2$.

As illustrated in FIG. 13 for example, in this case, an anomorphic lens (or anomorphic mirror) may be preferably used as the condenser lens 32, so that the conjugate relationship is established between the light receiving element 33 and the deflecting reflection surface of the polygon mirror 19 with respect to the sub scanning corresponding direction.

Generally, due to the function of the cylindrical lens 17, the light flux that is to enter the deflecting reflection surface of the polygon mirror 19 is focused on the deflecting reflection surface in the sub scanning corresponding direction. Thereby, the conjugate relationship as mentioned above, if existing, makes it possible to adjust or correct a positional deviation of the light spot on the light receiving element 33 in the sub scanning corresponding direction due to the optical face tangle error of the deflecting reflection surface. Additionally, the light spot narrowed with respect to the sub scanning corresponding direction forms an image on the light receiving element 33.

In the embodiment mentioned above, the explanation is made on a case that the deflection status of the light flux emitted from the light source 14 is the p-polarized light with respect to the polygon mirror 19. However, the present invention is not limited to the above embodiment.

Figure 14:
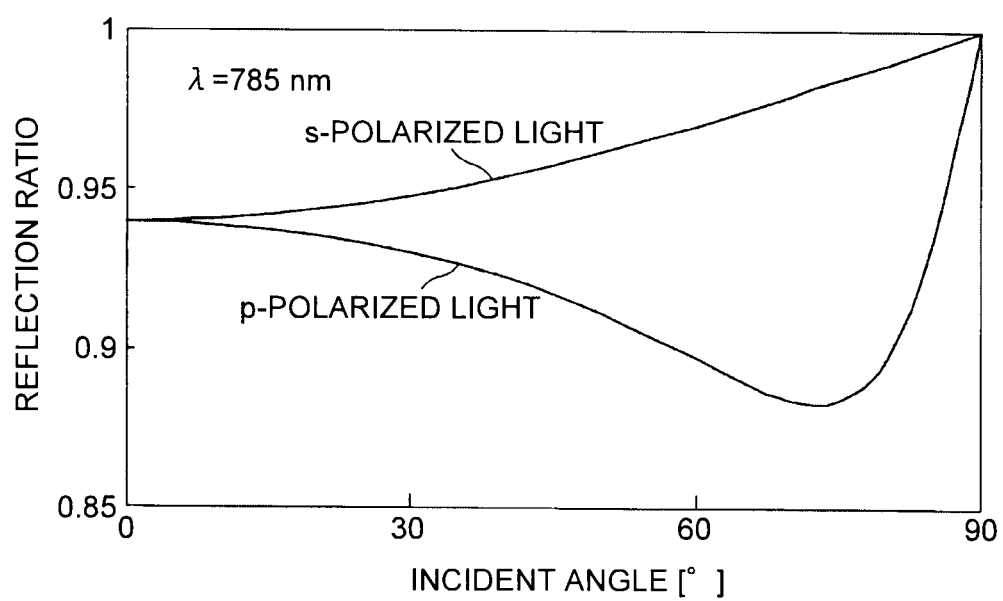
FIG. 14 is a graph illustrating a relationship between a reflection ratio and an incident angle at a reflection surface of a optical deflector when incident light flux is of p-polarized light and s-polarized light, respectively.

FIG. 14 shows the exemplary relationship between the incident angle and the reflection ratio on the deflecting reflection surface in both cases that the light that enters the polygon mirror 19 (also referred to as the incident light) is a p-polarized light and a s-polarized light, respectively. As illustrated in FIG. 14, if the incident light is the p-polarized light, there is a tendency that the reflection ratio decreases as the incident angle increases. On the other hand, if the incident light is the s-polarized light, there is a tendency that the reflection ratio increases as the incident angle increases.

Figure 15:
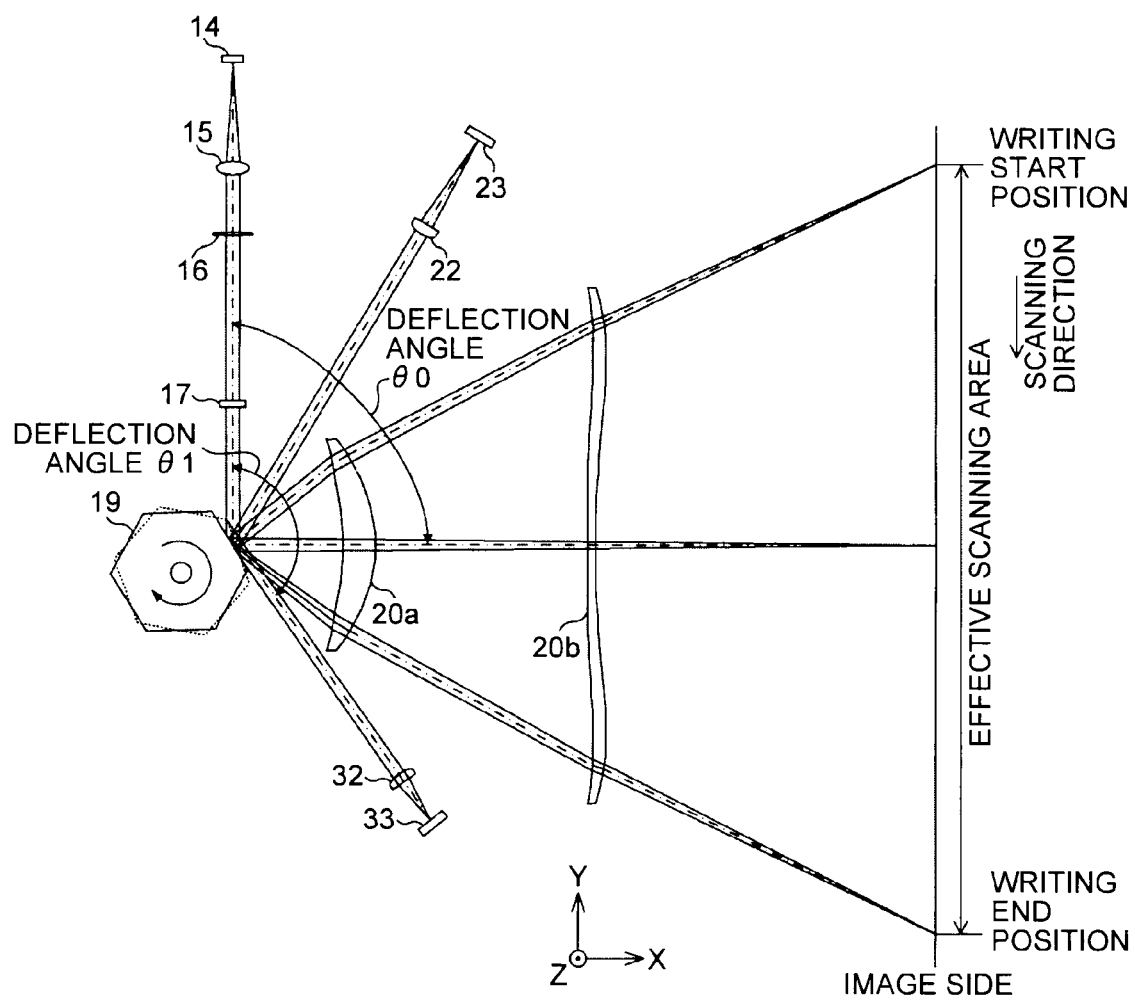
FIG. 15 is a schematic diagram illustrating a monitor optical system when the incident light flux is s-polarized light.
Figure 16:
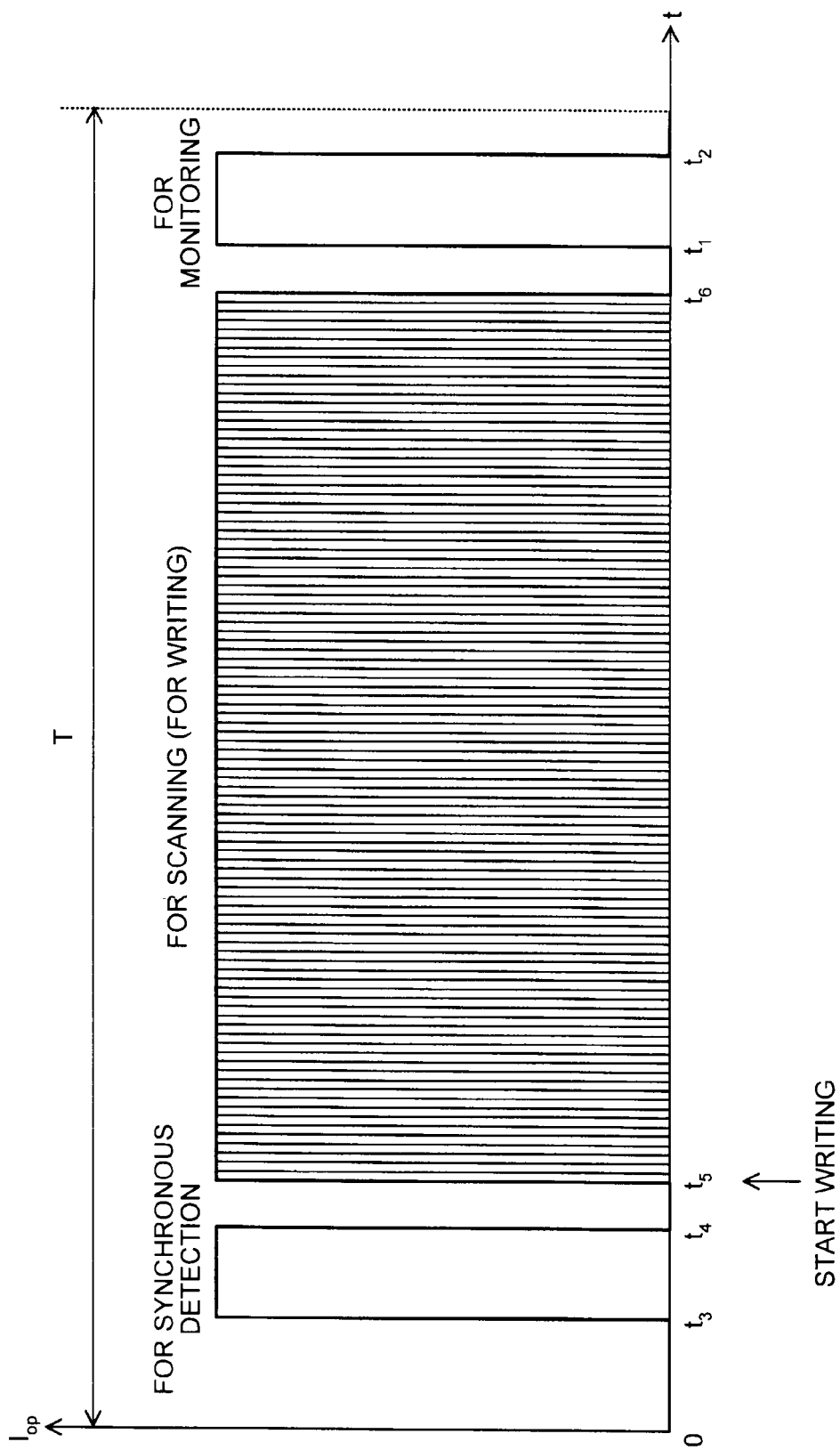
FIG. 16 is a time chart illustrating a drive signal of a light source corresponding to FIG. 15.

Therefore, if the incident light to the polygon mirror 19 is set as the s-polarized light, the equation (5) can be optically satisfied without changing the intensity of the drive current $I_{op}$ supplied to the light emitting elements of the light source 14, by aligning the light intensity monitoring system so as to satisfy the relationship θ0<θ1 (see FIG. 15).

It is noted that, although the polygon mirror 19 rotates clockwise in the above embodiment, however, the polygon mirror 19 may rotate counterclockwise so long as the above-described relationship between the polarized status of the light flux emitted from the light source 14 and each deflection angle ($\theta 0$, $\theta 1$) is satisfied.

Although the condenser lens 32 solely constitutes the monitor optical system in the above embodiment, the configuration is not limited thereto. The monitor optical system may include multiple optical elements.

Although the condenser lens 22 solely constitutes the synchronization detection optical system in the above embodiment, the configuration is not limited thereto. The synchronization detection optical system may include multiple optical elements.

Although the two dimensional array includes forty light emitting elements in the above embodiment, the configuration is not limited thereto.

Although the light source 14 includes a two dimensional array in the above embodiment, the configuration is not limited thereto. For example, a one dimensional array may be used in place of the two dimensional array, or a surface emitting laser element with a single light emitting element may be used.

Although the laser printer 1000 is used as an image forming apparatus in the above embodiment, its applicational use is not limited thereto. It is able to form high quality images as a result so long as an image forming apparatus includes the optical scanning device 1010.

It may be, for example, an image forming apparatus that irradiates a laser beam directly onto a medium (e.g., a sheet of paper) that produces color with a laser beam.

Moreover, it may be an image forming apparatus that uses a silver halide film as an image carrier. In this case, the image forming apparatus forms a latent image on the silver halide film by using optical scanning. The latent image is developed to a visible image by using the same process as a typical developing process for the silver halide photography. The visible image is transferred onto printing paper in the same manner as a typical printing process for the silver halide photography. This image forming apparatus can be used as a photo plate maker, an optical lithography system that forms a CT-scan image or the like.

Figure 17:
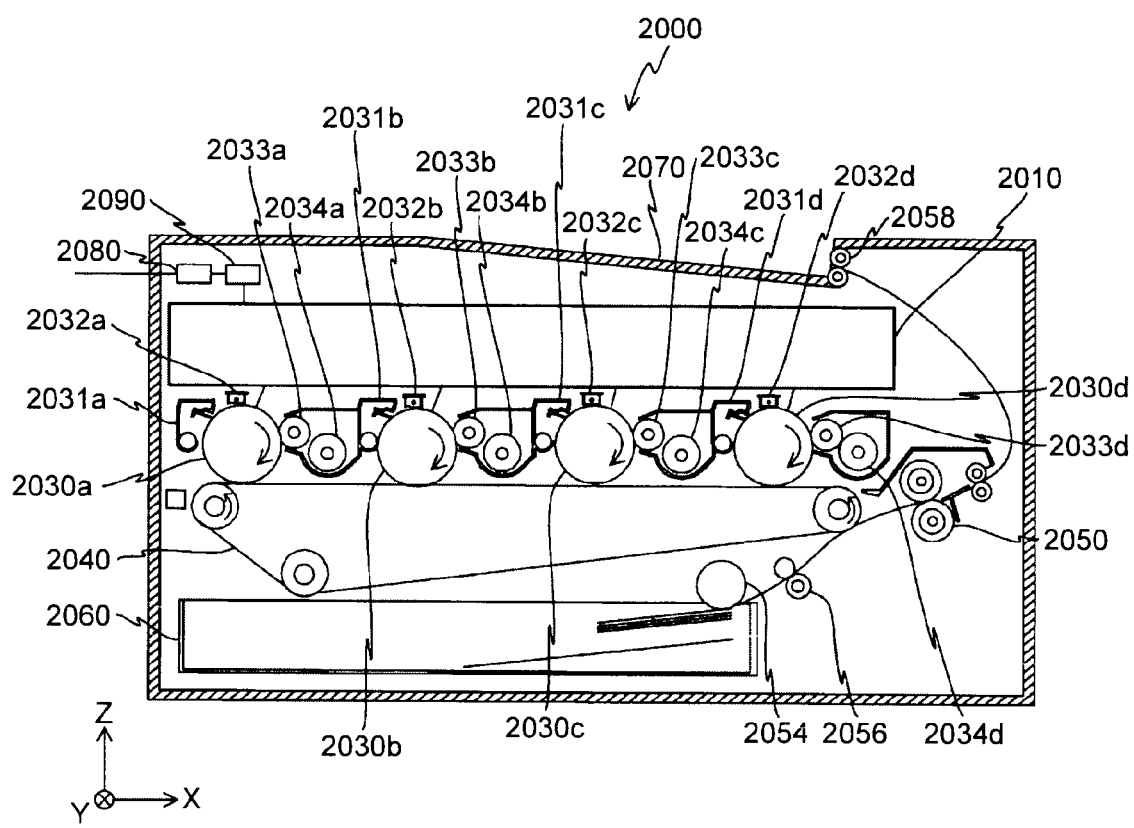
FIG. 17 is a schematic diagram illustrating a configuration of a color printer.

Furthermore, it may be a color printer 2000 that uses multiple photosensitive elements as illustrated in FIG. 17.

This color printer 2000 is a tandem-type multicolor printer that forms a full-color image by superimposing four color (black, cyan, magenta, and yellow) images on each other. The color printer 2000 includes an optical scanning device 2010, four photosensitive elements (2030a, 2030b, 2030c, and 2030d), four cleaning cases (2031a, 2031b, 2031c, and 2031d), four electrical chargers (2032a, 2032b, 2032c, and 2032d), four developing rollers (2033a, 2033b, 2033c, and 2033d), four toner cartridges (2034a, 2034b, 2034c, and 2034d), a transfer belt 2040, a fixing roller 2050, a paper feeding roller 2054, a pair of registration rollers 2056, a pair of discharging rollers 2058, a paper cassette 2060, a discharge tray 2070, a communication control device 2080, and a printer control device 2090 that integrally controls each of the above components and/or devices.

The photosensitive element 2030a, the electrical charger 2032a, the developing roller 2033a, the toner cartridge 2034a, and the cleaning case 2031a are used as a set and constitute an image forming station that forms black images (hereinafter, may be also referred to as "K station" for the sake of convenience).

The photosensitive element 2030b, the electrical charger 2032b, the developing roller 2033b, the toner cartridge 2034b, and the cleaning case 2031b are used as a set, and constitutes an image forming station that forms cyan images (hereinafter, may be also referred to as "C station" for the sake of convenience).

The photosensitive element 2030c, the electrical charger 2032c, the developing roller 2033c, the toner cartridge 2034c, and the cleaning case 2031c are used as a set and constitute an image forming station that forms magenta images (hereinafter, may be also referred to as "M station" for the sake of convenience).

The photosensitive element 2030d, the electrical charger 2032d, the developing roller 2033d, the toner cartridge 2034d, and the cleaning case 2031d are used as a set and constitute an image forming station that forms yellow images (hereinafter, may be also referred to as "Y station" for the sake of convenience).

Each charging device evenly charges the surface of the corresponding photosensitive element.

The optical scanning device 2010 irradiates the surface of the charged photosensitive element with each light flux that is modulated for each color, in accordance with the multi-colored image data (black image data, cyan image data, magenta image data, and yellow image data) from a higher-level device. Therefore, the electric charge disappears at a part of the surface of each photosensitive element that is irradiated with light, and thus a latent image is formed on the surface of each photosensitive element in accordance with the image data. The formed latent image is conveyed toward the developing roller in accordance with rotation of the photosensitive element.

The toner cartridge 2034a accommodates black toner and the black toner is supplied to the developing roller 2033a. The toner cartridge 2034b accommodates cyan toner and the cyan toner is supplied to the developing roller 2033b. The toner cartridge 2034c accommodates magenta toner and the magenta toner is supplied to the developing roller 2033c. The toner cartridge 2034d accommodates yellow toner and the yellow toner is supplied to the developing roller 2033d.

In accordance with rotation of the developing rollers, the surface of each developing rollers is covered evenly and thinly with the toner supplied from the corresponding toner cartridge. When the toner on the surface of each developing rollers comes into contact with the corresponding photosensitive element, the toner transfers to only the part of the surface of the corresponding photosensitive element irradiated with the light and attaches to the part. That is, each of the developing rollers attaches toner to the latent image that is formed on the surface of the corresponding photosensitive element, and thus forms a visible image. The image to which toner is attached (toner image) is then conveyed toward the transfer belt 2040 by rotation of the photosensitive element.

The yellow toner image, the magenta toner image, the cyan toner image, and the black toner image are sequentially transferred onto the transfer belt 2040 at a predetermined operational timing and superimposed to form a color image.

The paper cassette 2060 accommodates recording sheets. In the vicinity of the paper cassette 2060, the paper feeding roller 2054 is disposed. The paper feeding roller 2054 picks up a recording sheet one by one from the paper cassette 2060 and conveys the recording sheet to the pair of registration rollers 2056. The pair of registration rollers 2056 conveys the recording sheet toward the gap between the transfer belt 2040 and a transfer roller 2042 at a predetermined timing. Thus the color image on the transfer belt 2040 is transferred onto the recording sheet. The recording sheet onto which the color image is transferred is conveyed to the fixing roller 2050.

Heat and pressure is applied to the recording sheet at the fixing roller 2050 and thus the toner is fixed onto the recording sheet. The recording sheet on which the toner is fixed is conveyed to the discharge tray 2070 via the discharging rollers 2058 and then stacked on the discharge tray 2070 sequentially.

Each of the cleaning units removes toner that remains on the surface of the corresponding photosensitive element (residual toner). The surface of the photosensitive element, from which the residual toner has been removed, returns to the position to face the electrical charger.

The optical scanning device 2010 includes a light source for each color similar to the light source 14, and also includes a light intensity monitoring system and a synchronization detection system similar to the light intensity monitoring system and the synchronization detection system described in the optical scanning device 1010 respectively. Therefore, the optical scanning device 2010 brings about the same effects as those of the optical scanning device 1010.

Hence, the color printer 2000, because the optical scanning device 2010 is included therein, brings about the same effects as those of the laser printer 1000.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning surface in a main scanning direction, the optical scanning device comprising:
    a light source that includes a surface emitting laser;
    an optical deflector that includes a reflection surface that reflects a light flux from the light source while rotating around a rotation axis;
    a monitor light receiving element that receives a monitor light flux;
    a synchronization detection light receiving element that receives a synchronization detection light flux;
    a monitor optical system that directs the monitor light flux to the monitor light receiving element, the monitor light flux reflected on the reflection surface;
    a synchronization detection optical system that directs the synchronization detection light flux to the synchronization detection light receiving element, the synchronization detection light flux reflected on the reflection surface; and
    a scanning optical system that directs a scanning light flux to the scanning surface, the scanning light flux reflected on the reflection surface, wherein
    a combined focal length of the monitor optical system in the main scanning direction is smaller than a combined focal length of the synchronization detection optical system in the main scanning direction,
    six different timings $t_1$, $t_2$, $t_3$, $t$ $t_5$, and $t_6$ are in a relation in which $0<t_1<t_2<T$ and $0<t_3<t_4<t_5<t_6<T$ specify distinct timings during which each of the monitor light flux, the synchronization detection light flux, and the scanning light flux is individually reflected on the reflection surface, and T represents a time period during which each of the monitor light flux, the synchronization detection light flux, and the scanning light flux from the light source is sequentially reflected on the reflection surface,
    the monitor optical system is disposed on an optical path of the monitor light flux, which is reflected on the reflection surface during a time period from $t_1$ to $t_2$,
    the synchronization detection optical system is disposed on an optical path of the synchronization detection light flux, which is reflected on the reflection surface during a time period from $t_3$ to $t_4$,
    the scanning optical system is disposed on an optical path of the scanning light flux, which is reflected on the reflection surface during a time period from $t_5$ to $t_6$, and
    the monitor light receiving element is in a conjugate relationship in the main scanning direction with a cross point of: an extension of a line obtained by projecting the light flux reflected on the reflection surface at the timing $t_1$ on a plane orthogonal to the rotation axis;
    and an extension of a line obtained by projecting the light flux reflected on the reflection surface at the timing $t_2$ on the plane orthogonal to the rotation axis.

2. The optical scanning device according to claim 1, wherein
    a light intensity of the monitor light flux directed to the monitor light receiving element is higher than a minimum value of a light intensity of the light flux directed to the scanning surface.

3. The optical scanning device according to claim 2, wherein
    the light flux reflected on the reflection surface during the time period from $t_1$ to $t_2$ enters the monitor optical system without entering the scanning optical system.

4. The optical scanning device according to claim 2, wherein
    the light flux emitted from the light source is p-polarized light with respect to the optical deflector, and $\theta 0>\theta 1$ is satisfied in which $\theta 0$ represents a deflection angle by the optical deflector at the timing of scanning a center point of an effective scanning area and $\theta 1$ represents a deflection angle by the optical deflector at the timing of entering the monitor light receiving element.

5. The optical scanning device according to claim 2, wherein
    the light flux emitted from the light source is s-polarized light with respect to the optical deflector, and $\theta 0<\theta 1$ is satisfied in which $\theta 0$ represents a deflection angle by the optical deflector at the timing of scanning a center point of an effective scanning area and $\theta 1$ represents a deflection angle by the optical deflector at the timing of entering the monitor light receiving element.

6. The optical scanning device according to claim 1, wherein the monitor optical system is disposed on an optical path of the monitor light flux, which is reflected on the reflection surface during a time period from $t_1$ to $t_2$,
    the synchronization detection optical system is disposed on an optical path of the synchronization detection light flux, which is reflected on the reflection surface during a time period from $t_3$ to $t_4$,
    the scanning optical system is disposed on an optical path of the scanning light flux, which is reflected on the reflection surface during a time period from $t_5$ to $t_6$, and
    the monitor light receiving element is disposed closer to the optical deflector than a conjugate point in the main scanning direction with respect to a cross point of: an extension of a line obtained by projecting the light flux reflected on the reflection surface at the timing $t_1$ on a plane orthogonal to the rotation axis; and an extension of a line obtained by projecting the light flux reflected on the reflection surface at the timing $t_2$ on the plane orthogonal to the rotation axis.

7. The optical scanning device according to claim 1, wherein
a light receiving area of the monitor light receiving element is in a rectangular shape having its longer side in the main scanning direction.

8. The optical scanning device according to claim 1, wherein
the optical deflector and the monitor light receiving element are substantially in a conjugate relationship in a sub scanning direction orthogonal to the main scanning direction.

9. An image forming apparatus comprising:
at least one image carrier; and
an optical scanning device that scans said at least one image carrier with a light flux which is modulated corresponding to image data, wherein
the optical scanning device includes:
a light source that includes a surface emitting laser;
an optical deflector that includes a reflection surface that reflects a light flux from the light source while rotating around a rotation axis;
a monitor light receiving element that receives a monitor light flux;
a synchronization detection light receiving element that receives a synchronization detection light flux;
a monitor optical system that directs the monitor light flux to the monitor light receiving element, the monitor light flux reflected on the reflection surface;
a synchronization detection optical system that directs the synchronization detection light flux to the synchronization detection light receiving element, the synchronization detection light flux reflected on the reflection surface; and
a scanning optical system that directs a scanning light flux to the scanning surface, the scanning light flux reflected on the reflection surface, wherein
a combined focal length of the monitor optical system in the main scanning direction is shorter than a combined focal length of the synchronization detection optical system in the main scanning direction,
six different timings $t_1$, $t_2$, $t_3$, $t_4$, $t_5$, and $t_6$ are in a relation in which $0<t_1<t_2<T$ and $0<t_3<t_4<t_5<t_6<T$ specify distinct timings during which each of the monitor light flux, the synchronization detection light flux, and the scanning light flux is individually reflected on the reflection surface, and T represents a time period during which each of the monitor light flux, the synchronization detection light flux, and the scanning light flux from the light source is sequentially reflected on the reflection surface,
the monitor optical system is disposed on an optical path of the monitor light flux, which is reflected on the reflection surface during a time period from $t_1$ to $t_2$,
the synchronization detection optical system is disposed on an optical path of the synchronization detection light flux, which is reflected on the reflection surface during a time period from $t_3$ to $t_4$,
the scanning optical system is disposed on an optical path of the scanning light flux, which is reflected on the reflection surface during a time period from $t_5$ to $t_6$, and
the monitor light receiving element is in a conjugate relationship in the main scanning direction with a cross point of: an extension of a line obtained by projecting the light flux reflected on the reflection surface at the timing $t_1$ on a plane orthogonal to the rotation axis; and an extension of a line obtained by projecting the light flux reflected on the reflection surface at the timing $t_2$ on the plane orthogonal to the rotation axis.

10. The image forming apparatus according to claim 9, wherein the image data is multi-colored image data.

11. An optical scanning device that scans a scanning surface in a main scanning direction, the optical scanning device comprising:
a light source that includes a surface emitting laser;
an optical deflector that includes a reflection surface that reflects a light flux from the light source while rotating around a rotation axis;
a monitor light receiving element that receives a monitor light flux;
a synchronization detection light receiving element that receives a synchronization detection light flux;
a monitor optical system that directs the monitor light flux to the monitor light receiving element, the monitor light flux reflected on the reflection surface;
a synchronization detection optical system that directs the synchronization detection light flux to the synchronization detection light receiving element, the synchronization detection light flux reflected on the reflection surface; and
a scanning optical system that directs a scanning light flux to the scanning surface, the scanning light flux reflected on the reflection surface, wherein
a combined focal length of the monitor optical system in the main scanning direction is smaller than a combined focal length of the synchronization detection optical system in the main scanning direction,
six different timings $t_1$, $t_2$, $t_3$, $t_4$, $t_5$, and $t_6$, are in a relation in which $0<t_1<t_2<T$ and $0<t_3<t_4<t_5<t_6<T$, wherein 0 represents zero and T represents a time period during which the light flux from the light source is reflected on the reflection surface,
the monitor optical system is disposed on an optical path of a light flux which is reflected on the reflection surface during a time period from $t_1$ to $t_2$,
the synchronization detection optical system is disposed on an optical path of a light flux which is reflected on the reflection surface during a time period from $t_3$ to $L_4$,
the scanning optical system is disposed on an optical path of a light flux which is reflected on the reflection surface during a time period from $t_5$ to $t_6$,
the monitor light receiving element is disposed closer to the optical deflector than a conjugate point in the main scanning direction with respect to a cross point of: an extension of a line obtained by projecting the light flux reflected on the reflection surface at the timing $t_1$ on a plane orthogonal to the rotation axis; and an extension of a line obtained by projecting the light flux reflected on the reflection surface at the timing $t_2$ on the plane orthogonal to the rotation axis,
the monitor optical system is disposed on an optical path of the monitor light flux, which is reflected on the reflection surface during a time period from $t_1$ to $t_2$,
the synchronization detection optical system is disposed on an optical path of the synchronization detection light flux, which is reflected on the reflection surface during a time period from $t_3$ to $t_4$,
the scanning optical system is disposed on an optical path of the scanning light flux, which is reflected on the reflection surface during a time period from $t_5$ to $1_6$, and
the monitor light receiving element is in a conjugate relationship in the main scanning direction with a cross point of: an extension of a line obtained by projecting the light flux reflected on the reflection surface at the timing $t_1$ on a plane orthogonal to the rotation axis;

and an extension of a line obtained by projecting the light flux reflected on the reflection surface at the timing $t_2$ on the plane orthogonal to the rotation axis.

* * * * *